United States Patent [19]

Chande et al.

[11] Patent Number: 4,817,020

[45] Date of Patent: Mar. 28, 1989

[54] COOLING RATE DETERMINATION APPARATUS FOR LASER MATERIAL PROCESSING

[75] Inventors: Tushar S. Chande, Schenectady; Angel L. Ortiz, Jr., Ballston Lake, both of N.Y.

[73] Assignee: General Electric Company, Schenectady, N.Y.

[21] Appl. No.: 64,644

[22] Filed: Jun. 22, 1987

[51] Int. Cl.[4] .................. G01K 1/16; G06F 15/46
[52] U.S. Cl. .................. 364/557; 250/339; 364/477; 374/9; 374/127; 374/129
[58] Field of Search .............. 374/9, 173, 126–129, 364/477; 364/557, 571; 250/339, 340; 219/121 L, 121 LC, 121 LB

[56] References Cited

U.S. PATENT DOCUMENTS

| | | | |
|---|---|---|---|
| 3,849,000 | 11/1974 | Soardo et al. | 374/127 |
| 3,922,550 | 11/1975 | Crowley et al. | 374/9 |
| 3,992,943 | 11/1976 | Schiefer et al. | 374/127 |
| 4,045,670 | 8/1977 | Anderson et al. | 374/129 |
| 4,561,786 | 12/1985 | Anderson | 374/129 |
| 4,564,736 | 1/1986 | Jones et al. | 219/121 L |
| 4,579,461 | 4/1986 | Rudolph | 374/9 |
| 4,645,917 | 2/1987 | Penney et al. | 250/201 |
| 4,673,795 | 6/1987 | Ortiz, Jr. | 219/121 L |
| 4,676,586 | 6/1987 | Jones et al. | 350/96.20 |
| 4,681,396 | 7/1987 | Jones | 350/96.18 |
| 4,681,434 | 7/1987 | Kepple | 374/127 |
| 4,707,073 | 11/1987 | Kocher | 350/96.23 |
| 4,739,162 | 4/1988 | Ortiz, Jr. et al. | 250/227 |
| 4,764,025 | 8/1988 | Jensen | 374/128 |

OTHER PUBLICATIONS

TrueTemp 9100 System literature from Williamson Corp., Concord, Mass., Jul. 1985.
"The Dual Wavelength Radiometer" by Alan S. Anderson of Williamson Corp., Concord, Mass.
Model C/CK 57-51 Motor and Model PC23 Indexer Board literature from Parker Hannifin Corporation, Petaluma, Cal., Jan. 1987.

Primary Examiner—Parshotam S. Lall
Assistant Examiner—Kevin J. Teska
Attorney, Agent, or Firm—Richard V. Burgujian; James C. Davis, Jr.; Paul R. Webb, II

[57] ABSTRACT

A laser materials processing system for computing a real time cooling rate experienced on a workpiece and responsively controlling the operation of a materials processing laser. An image of a point of laser beam-material interaction is transmitted via imaging optical fibers to ratio pyrometer apparatus which provides temperature proportional signals. The temperature signals are used to compute cooling rate.

12 Claims, 7 Drawing Sheets

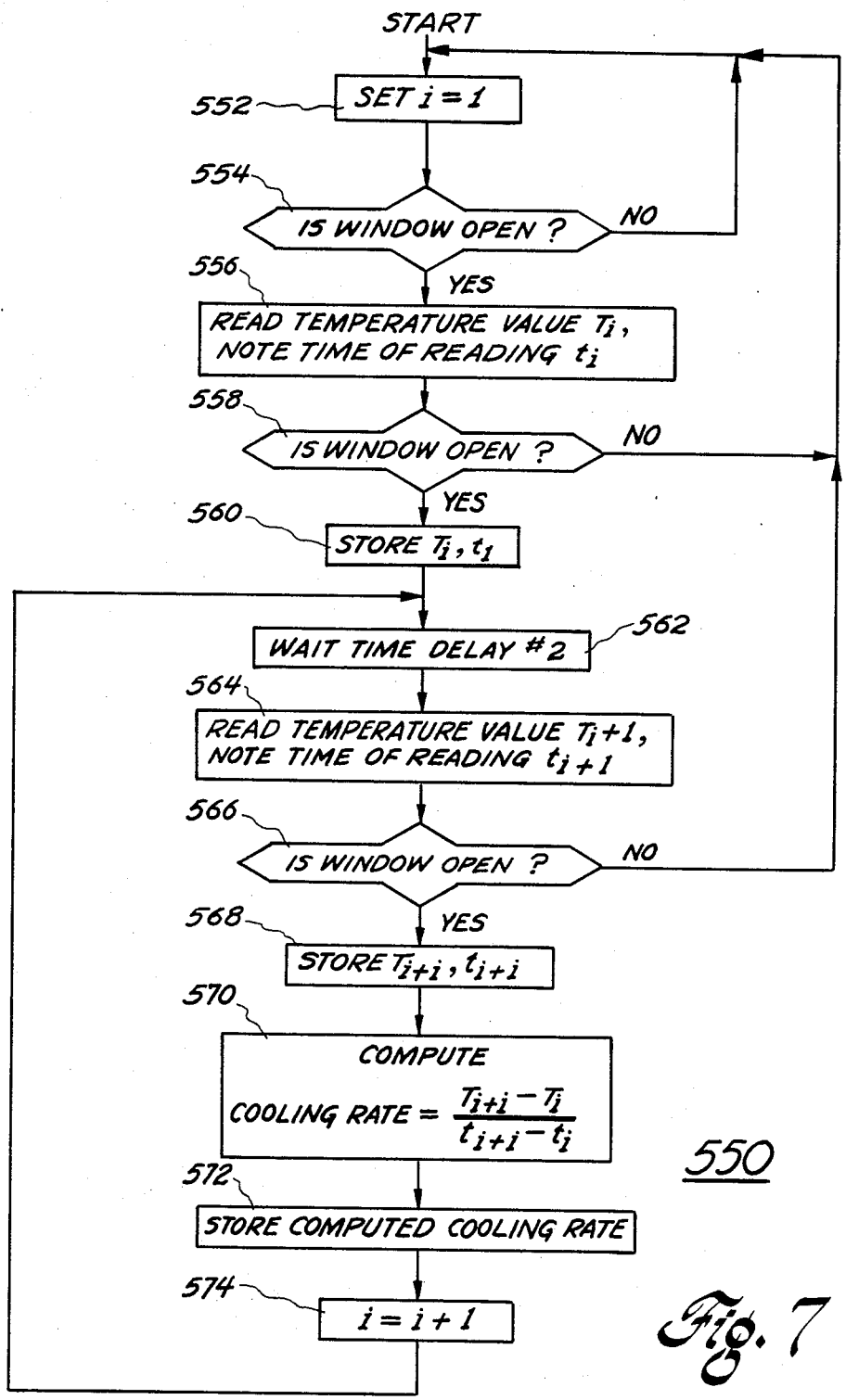

COOLING RATE DETERMINATION APPARATUS FOR LASER MATERIAL PROCESSING

The present invention is directed in general to material processing with a laser and, more specifically, to apparatus for providing a real time determination of cooling rates experienced on a workpiece being processed with a laser.

BACKGROUND OF THE INVENTION

The cooling rate experienced in a material being processed with a laser is an important parameter in both the design and control of such a process. Cooling rate as used herein is the rate at which the temperature at a specific point of laser beam-material interaction decreases with time following subjection to the material processing laser beam. In laser materials processes, such as welding or cutting, the settings of process parameters such as laser power, focused beam spot size and the speed at which the laser beam traverses the workpiece are determinative of the quality of the end product of the process. For example, in the case of laser welding, the nature and quality of the weld achieved by the process is determined by such process parameters. The material cooling rate experienced during processing is a direct result of such process parameter settings. Ultimately, the cooling rate is a key characteristic of the material being processed that determines whether or not the laser process is being conducted optimally.

It is therefore important to obtain cooling rate information in order to enable optimization of a particular laser materials process. As is known in the art, cooling rates are usually estimated after the fact rather than measured during the process. One known method for estimating cooling rate, performed after the laser processing is complete, is to examine the microstructure of the processed material and evaluate that microstructure in terms of phase transformation kinetics. Alternatively, or in combination with the microstructure examination method, the cooling rate may be estimated from a mathematical model of the laser process. Obviously, such estimating techniques offer no possibility for the real time control of the laser process. Instead, they only provide the ability to make an after the fact determination that the process was not conducted optimally and, as a result, the adjustment of one or more process parameters is required. Even after such parameters are adjusted to achieve optimal processing, the maintenance of the process in an optimal state during subsequent operations is only achieved through control of the process parameters to conform to previously determined settings. As a result, cooling rate control is indirect both because it is achieved through control of process parameters in accordance with predetermined settings and also because such settings are based on earlier cooling rate estimates.

It is therefore highly desirable to obtain real time cooling rate information and further to directly utilize such information for real time laser materials processing control. In the broadest sense, real time information and control are used herein to describe information relating to the process, e.g. cooling rate, obtained during process operation and the control of process parameters in accordance with the real time information, such control also being effected during process operation. It is noted that the time period between obtaining real time information and the responsive adjustments of process parameters will vary depending on the nature of the particular process. It is known in the art to use thermocouples to measure material cooling rate in real time. However, this technique of real time cooling rate measurement is limited by the thermocouple melting point, junction size and response time. It is noted that a fast measurement response time, on the order of milliseconds, is required for real time cooling rate measurement since the cooling rate experienced during laser materials processing may be on the order of $10^{6°}$ C./second.

Infrared radiometric techniques of temperature measurement offer a possible method for real time cooling rate determination. Infrared radiometry as used herein is the measurement of the intensity of infrared electromagnetic radiation. Such techniques do not require contact with the object the temperature of which is being measured and therefore do not suffer the melting problem of thermocouples. The ratio pyrometer, known in the art, is one example of an infrared radiometric temperature measuring device. The ratio pyrometer measures the temperature of an object by comparing the intensity of infrared radiation emitted by the object at two different wavelengths. The computed ratio of the intensities at the respective wavelengths is proportional to the object temperature. Ratio pyrometer apparatus as presently configured and known in the art cannot, however, be used to provide real time cooling rate information. This is because, in consideration of the above noted cooling rate that may be experienced during laser processing, the ratio pyrometer is not capable of making successive temperature measurements quickly enough to provide an accurate cooling rate value.

It is a principal object of the present invention to provide a laser materials processing system including apparatus for the real time determination of cooling rate experienced on a workpiece being subjected to laser processing and the real time control of laser operation in accordance with the determined cooling rate.

SUMMARY OF THE INVENTION

In accordance with the present invention there is provided a laser materials processing system in which the cooling rate being experienced in a predetermined region of a workpiece is computed in real time and the operation of a materials processing laser is controlled, in real time, in accordance with the computed cooling rate. The processing system comprises means for subjecting the workpiece to the laser beam generated by the materials processing laser, means for providing an image of the predetermined region of the workpiece, and means for generating from the image a temperature signal representative of a current temperature of the workpiece predetermined region. Successively generated values of the temperature signal are provided to cooling rate computing means which also notes the time of occurrence corresponding to each such signal. Then, from successive values of the temperature signal and the associated times of occurrence, the cooling rate computing means computes cooling rates and generates cooling rate signals respectively representative of the computed cooling rates. The cooling rate signals are provided to control means for controlling the operation of the materials processing laser, so that laser operation is responsive to the computed cooling rates.

In a preferred embodiment of the present invention, the materials processing laser is provided as a pulsed laser so that the laser beam alternates between an onand an off-state. The workpiece predetermined region is defined to include a point of laser beam-material interaction. The cooling rate is only computed based on temperatures occurring during the laser beam off-state. The temperature generating means is provided as infrared radiometric means in the form of a ratio pyrometer specifically adapted for the practice of the present invention. The ratio pyrometer includes first and second filter means for respectively transmitting first and second infrared radiation wavelengths occurring substantially simultaneously in the image of the workpiece predetermined region. The ratio pyrometer further includes first and second detector means for respectively generating first and second analog signals in response to the intensities of the first and second wavelengths of the image. The first and second analog signals are amplified and applied, as first and second infrared radiation intensity signals, to a divider which provides a signal representing the magnitude of the quotient of the applied signals. The signal so provided is the above described temperature signal.

In the preferred embodiment, the cooling rate computing means is provided in the form of a computer coupled to receive the successively generated temperature signals in digital form through an analog-to-digital interface. The computer also notes the occurrence times respectively associated with the temperature signals and is thereby enabled to compute a new cooling rate upon receiving each successively generated temperature signal.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 7 is a flowchart representation of a program executed by a cooling rate computer to compute cooling rates.

DESCRIPTION OF THE INVENTION

Figure 1A:
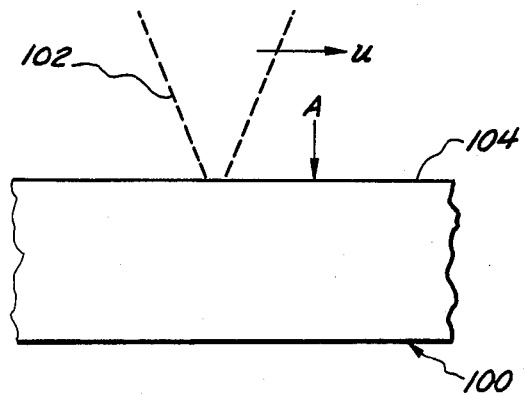
FIGS. 1a, 1b and 1c illustrate temperature determinations on a workpiece being subjected to a continuous wave laser.

Material processing is accomplished with both continuous wave (CW) and pulsed lasers. With respect to processes conducted with either type of laser, it is desirable to provide a real time cooling rate information at the point of laser beam-material interaction. Provision of such real time cooling rate information would enhance the closed loop control of the process. The nature of the required temperature measurements to be made as part of cooling rate determination is different for CW as opposed to pulsed laser applications. FIG. 1a illustrates in a section view a workpiece 100 being subjected to a CW laser beam 102 directed substantially perpendicularly onto a surface 104 of the workpiece. The laser may be so directed onto the workpiece pursuant to a material process such as cutting or welding. Laser beam 102 is traversing across workpiece 100, in the plane of FIG. 1a, at a speed "u". Assuming the traverse speed and laser beam power are constant, the cooling rate can be determined by commencing temperature measurement at a predetermined point in the path of the laser beam immediately following interaction between the beam and that predetermined point. For example in FIG. 1a, temperature measurement may be made at a predetermined point A which is fixed on surface 104. In such a case, the cooling rate is simply determined from the difference between any two successive temperature measurements at point A divided by the elapsed time therebetween. Obviously more than one fixed point could be designated for temperature measurements, and hence, cooling rate determination.

Figure 1B:
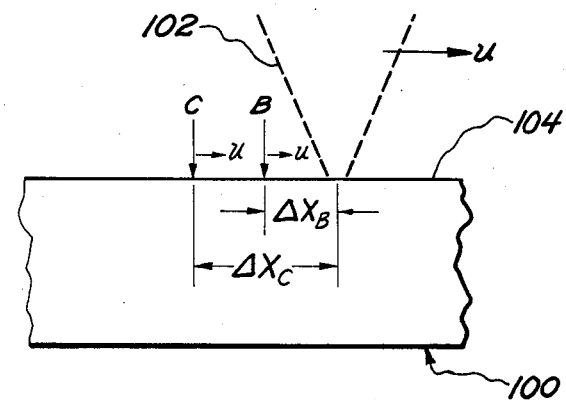

Alternatively, rather than maintaining one or more points fixed relative to the laser beam, two or more points of temperature measurement on surface 104 could be maintained at a fixed distance behind the point of interaction between the laser beam and surface 104. Thus, these measurement points would move with the laser beam. As an example of this method, referring to FIG. 1b, two points B and C are defined to move with the laser beam at speed u and at distances $\Delta X_B$ and $\Delta X_C$ behind the beam, respectively. Then, with temperatures $T_B$ and $T_C$ simultaneously measured at points B and C, respectively, the cooling rate at any instant is defined as:

$$\left[\frac{T_B - T_C}{\Delta X_C - \Delta X_B}\right] \times u$$

Figure 1C:
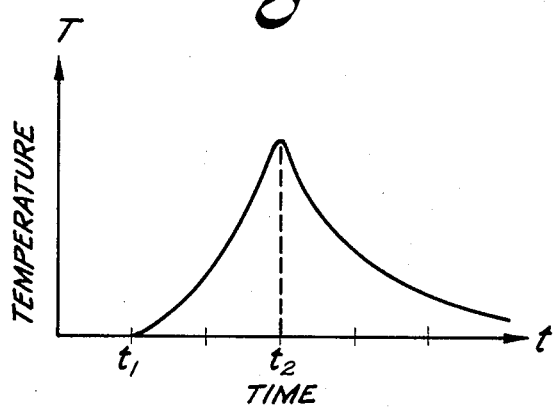

FIG. 1c illustrates a plot of temperature as a function of time as may be experienced at a fixed point on surface 104 due to a CW laser beam. Time $t_1$ corresponds to when the temperature begins to increase due to the approaching laser beam. Time $t_2$ corresponds to the laser beam being directed onto the fixed point of temperature measurement. As a result, the temperature profile for time immediately following $t_2$ is of interest as cooling rate information.

Figure 2A:
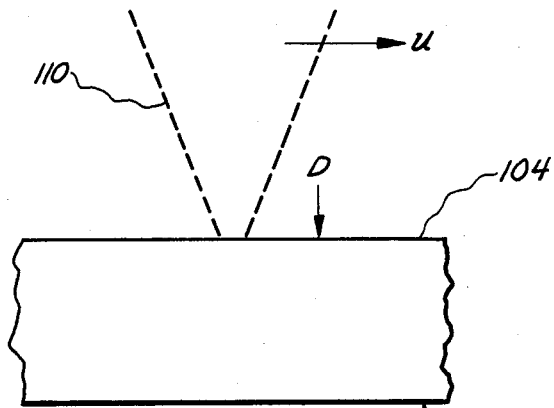
FIGS. 2a, 2b and 2c illustrate temperature determinations on a workpiece being subjected to a pulsed laser.
Figure 2B:
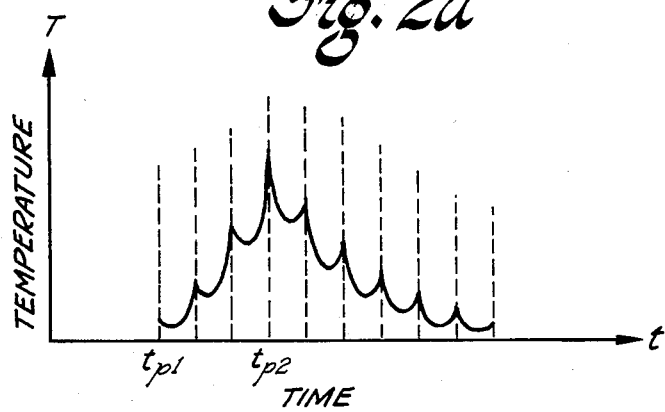
Figure 2C:
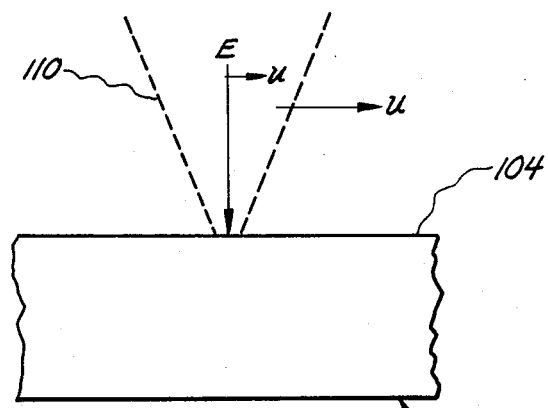

As stated above, the nature of the required temperature measurement for cooling rate determination differs for a pulsed laser. Since the beam generated by a pulsed laser alternates between an on- and an off-state, cooling of the workpiece occurs between pulses. Therefore the cooling rate experienced between pulses is of interest for the purpose of controlling the process parameters. Note that in the case of the pulsed laser as distinguished from the CW laser, in addition to the parameters noted above, the parameters of pulse rate and pulse length are also subject to control. Thus, the control of these process parameters in addition to the others noted above may be enhanced, in a closed looped control system, by provision of real time cooling rate information. FIG. 2a illustrates workpiece 100 being subjected to a pulsed laser beam 110 which is traversing surface 104 at speed u for a purpose such as welding or cutting. A fixed point D at which temperature measurements are to be made is defined in the path of the laser beam. In such a case, the temperature experienced at point D, as a function of time, may appear as illustrated in FIG. 2b. The vertical broken lines, such as occur at times $t_{p1}$ and $t_{p2}$, designate the arrival times of successive pulses. Time $t_{p1}$ corresponds to when an increase in temperature due to approaching laser beam 110 is detected at point D. Time $t_{p2}$ corresponds to beam 110 being incident directly on point D. As can be seen from the plot in FIG. 2b, cooling occurs between successive pulses. With respect to the pulsed laser beam, while cooling rate information at a fixed point, such as illustrated in FIG. 2b, may be useful in process control, it is preferred herein to determine the cooling rate experienced between laser pulses at the point of laser beam-material interaction. To determine this cooling rate, it is necessary to define, as illustrated in FIG. 2c, a temperature measurement point E which is at the point of laser beam-material interaction and therefore traverses the workpiece with the laser beam at speed u. Apparatus for the determination of the cooling rate experienced at the point of laser beam-material interaction for a pulsed laser is described hereinbelow as a preferred embodiment of the present invention.

In order to implement the cooling rate determination apparatus preferred herein, an infrared radiometric temperature measurement technique is used. Specifically, a modified form of ratio pyrometer is implemented to provide temperature measurements. As stated above, ratio pyrometers as known in the art cannot provide successive temperature measurements with sufficient speed to provide meaningful cooling rate information for laser materials processing as contemplated herein. However, such ratio pyrometer apparatus can be modified, in a novel manner described more fully below, to provide the requisite successive measurement speed.

Figure 3:
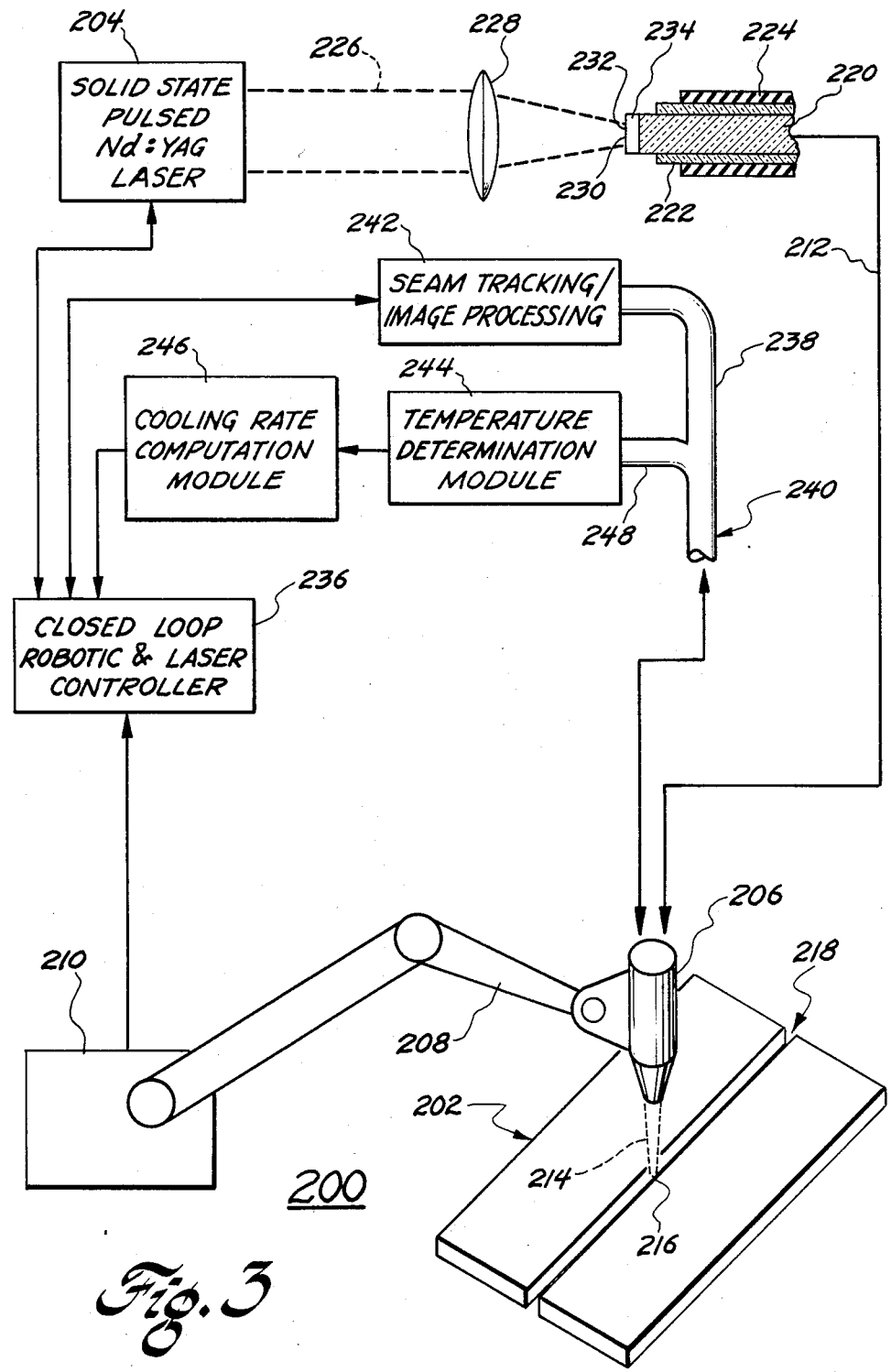
FIG. 3 illustrates a laser materials processing system, including temperature and cooling rate determination apparatus, constructed in accordance with the preferred embodiment of the present invention.

FIG. 3 illustrates a laser materials processing system 200, such as for the exemplary seam welding of a workpiece 202, in which the material cooling rate is computed in real time and used in the closed loop process control. System 200 includes a 1.06 micrometer wavelength neodymium:yttrium-aluminum-garnet (Nd:YAG) laser 204 for providing a pulsed power laser beam with an average output power on the order 400 watts. Such a laser is available from Raytheon Corporation of Burlington, Mass. as model #SS550. A remote or output module 206 is adapted for manipulation by an arm 208 of an industrial robot 210.

A single-core optical fiber 212 transmits energy from laser 204 to remote module 206 to be collimated and focused by an optical system within the remote module to emerge as rays 214 focused to a point 216 on workpiece 202 to effect welding of a representative seam 218. Thus, point 216 is the point of laser beam-material interaction. Optical fiber 212 may comprise a 1000 micrometer (0.040 in.) diameter fused quartz core 220 with clear silicon cladding 222 and an outer nylon jacket 224 for physical protection. A beam 226 emerging from the laser is focused by a lens 228 to a spot 230 on an input end 232 of the optical fiber. To enhance transmission of the laser beam 226 energy into the optical fiber, an antireflective coating 234 is provided on end 232.

Various techniques for the efficient coupling of such laser energy into a fiber optic core are described in the commonly-assigned U.S. Pat. Nos. 4,564,736; 4,681,396; and 4,676,586, respectively entitled "Industrial Hand Held Laser Tool and Laser System", "High Power Laser Energy Delivery System" and "Apparatus and Method For Performing Laser Material Processing Through a Fiber Optic", the entire disclosures of which are hereby expressly incorporated by reference.

For controlling the operation of system 200, a closed looped robotic and laser controller 236 is provided. Controller 236 operates generally in accordance with known principles employing vision and seam tracking for guiding robot arm 208 and operating laser 204. To enable such seam tracking, a branch 238 of a fiber optic bundle 240 for transmitting images is connected between remote module 206 and a seam tracking/image processing module 242. Module 242 is in turn coupled to controller 236 to enable closed looped control of the movement of robot arm 208. As stated above, methods for robotic control by seam tracking are known in the art. Such methods do not form a part of the present invention and are therefore not disclosed in detail herein. Exemplary apparatus for performing such seam tracking is disclosed in commonly-assigned U.S. Pat. No. 4,645,917 entitled "Swept Aperture Flying Spot Profiler."

Remote module 206 includes a plural path optical system both for focusing the laser beam emerging from an output end of fiber 212 along a first optical path to point 216 on workpiece 202, and for imaging that point of lasermaterial interaction along a second optical path onto the end of fiber optic bundle 240. Various constructions of remote module 206 are disclosed in plural embodiments of commonly-assigned U.S. Pat. No. 4,673,795 entitled "Integrated Robotic Laser Material Processing and Imaging System" which is incorporated in its entirety herein by reference.

Processing system 200 further includes a temperature determination module 244 for rapidly providing successive temperature signals representative of the temperature values at the laser beam-material interaction point. Also included in the processing system is a cooling rate computation module 246 which is coupled to receive the successive temperature signals from temperature module 244 and compute therefrom the cooling rate. Cooling rate module 246 is coupled to controller 236 in order to provide thereto the computed cooling rates so that such information may be used in the closed looped control of system 200. Temperature module 244, a preferred construction of which is described in detail hereinbelow, requires for its operation an image of the laser beam-material interaction point. In order to provide this required image, a branch 248 of fiber optic bundle 240 is connected to temperature module 244.

Figure 4:
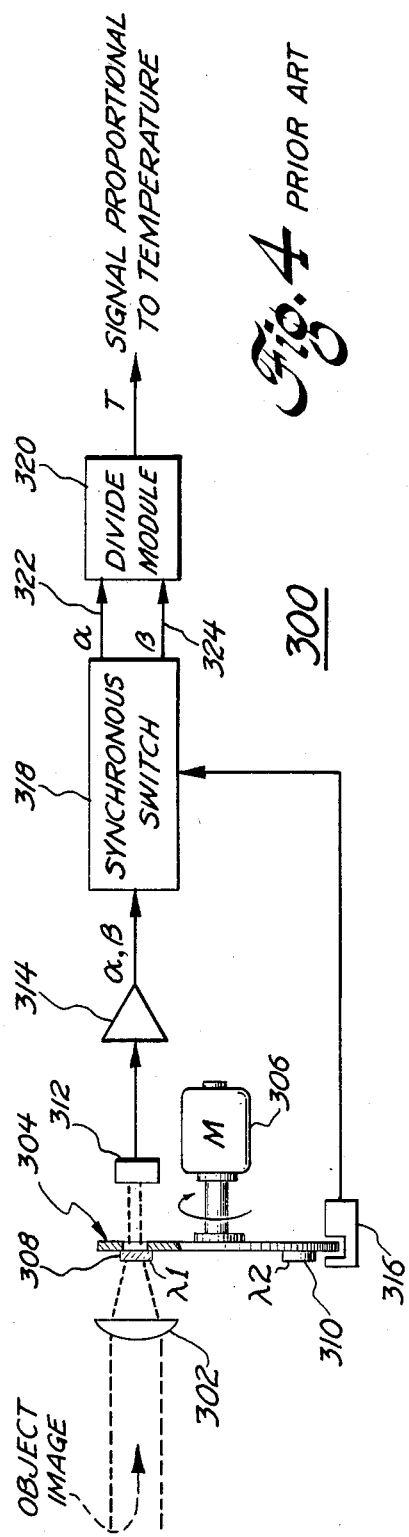
FIG. 4 illustrates the construction of a dual wavelength ratio pyrometer known in the art.

Before describing the preferred construction of temperature module 244, it is instructive to first consider ratio pyrometers as presently constructed and known in the art. FIG. 4 is a diagrammatic illustration of one such ratio pyrometer 300 as manufactured by Williamson Corporation of Concord, Mass. as the TRUETEMP 9100 ™ ratio pyrometer. As stated above, a ratio pyrometer measures the temperature of an object by computing a ratio of the infrared radiation intensities emitted by the object at two different wavelengths. The computed ratio is proportional to the object temperature. Thus, pyrometer 300 receives an image of the object the temperature of which is being measured and that image is focused through a lens 302 onto a rotating filter wheel 304. The rotation of wheel 304 is driven by a motor 306. Wheel 304 includes two wavelength filters 308 and 310 which are, by the wheel rotation, alternately brought into registration with the path of the image focused through lens 302. Filters 308 and 310 are positioned in the wheel to respectively permit transmission therethrough of a first ($\lambda_1$) and a second ($\lambda_2$) predetermined wavelength of infrared radiation. The radiation transmitted through either filter 308 or 310 falls incident on a detector 312, such as a photodiode, which generates an analog signal proportional to the intensity of the incident radiation. The signal generated by detector 312 is amplified by an amplifier 314. The amplified analog signals respectively due to wavelengths $\lambda_1$ and $\lambda_2$ are designated $\alpha$ and $\beta$. The actual wavelengths corresponding to $\lambda_1$ and $\lambda_2$ for the above noted Williamson TRUETEMP 9100 TM ratio pyrometer are approximately 810 and 710 nanometers, respectively.

A synchronous detector module 316 provides a synchronizing signal to indicate each time filter wheel 304 is positioned so that one or the other of the two filters 308, 310 transmits the focused image. Module 316 may simply comprise a light source aligned with a photocell so that a light path between the source and photocell is interrupted by the rim of wheel 304. Then, appropriately positioned apertures in the wheel rim cause generation by the photocell of each synchronizing signal. Module 316 is coupled to a synchronous switch 318 to provide thereto the synchronizing signals. Synchronous switch 318 is also coupled to receive from amplifier 314 the amplified intensity signals $\alpha$ and $\beta$. Synchronous switch 318 is further coupled to a divide module 320 to provide thereto on a first input 322 and a second input 324 the $\alpha$ and $\beta$ signals, respectively. Synchronous switch 318 is enabled, by the synchronizing signals, to distinguish between the $\alpha$ and $\beta$ signals received from amplifier 314. Divide module 320 provides an output signal "T" representative of a quotient $\alpha/\beta$. This signal is proportional to the temperature of the object, the image of which is focused through lens 302. If it is desired to determine the actual temperature being measured, calibration of the output signals "T" would be required.

Certain features of pyrometer 300 are of particular interest. First, a single detector 312 is used. A primary reason for this is to eliminate any drift in detector characteristics as a factor in the temperature measurement. Given the constraint of a single detector, each value of signal "T" (and hence temperature measurement) is the result of two analog signals provided by detector 312 at successive points in time. A second feature of pyrometer 300 that is of interest is the speed at which filter wheel 304 is rotated by motor 306. In the above-noted Williamson TRUETEMP 9100 TM ratio pyrometer, motor 306 rotates at 80 RPM. A third feature of interests is the angular separation between filters 308 and 310 on filter wheel 304. The angular separation along with the rotating speed of the filter wheel enables determination of the time ensuing between filters 308 and 310 respectively being brought into registration with the focused image, this time being referred to herein as a measurement interval time. For example, if filters 308 and 310 are 180° apart, and the filter wheel rotates at a speed of 80 RPM, the measurement interval time is approximately 0.38 seconds. Considering the rapid cooling rate being determined in a laser materials processing application, i.e. on the order of $10^{6°}$ C./second, the measurement interval time between the $\lambda_1$ and $\lambda_2$ intensity measurements has a critical effect on the accuracy of that determination. Obviously, where the detected intensities at wavelengths $\lambda_1$ and $\lambda_2$ respectively correspond to two widely disparate temperatures, the subsequently determined temperature signal "T" has no physical significance.

Operating motor 306 at a higher speed and reducing the angular separation between filters 308 and 310 on the filter wheel would serve to reduce the measurement interval time. For example, if motor 306 is operated at 2500 RPM and the angular separation between filters 308 and 310 is reduced to 90°, the measurement interval time would be reduced to approximately 6 milliseconds. Where the cooling rate to be determined is relatively moderate, this measurement interval time may be suitably short. However, for the above noted $10^{6°}$ C./second rate, the temperature at the laser beam-material interaction point would decrease approximately 6000° C. between the $\lambda_1$ and $\lambda_2$ intensity measurements. Thus, it is concluded that ratio pyrometer 300 as configured in FIG. 4 and described hereinabove is not suitable for providing real time temperature measurements for the determination of the substantial cooling rates contemplated for the practice of the present invention.

Figure 5:
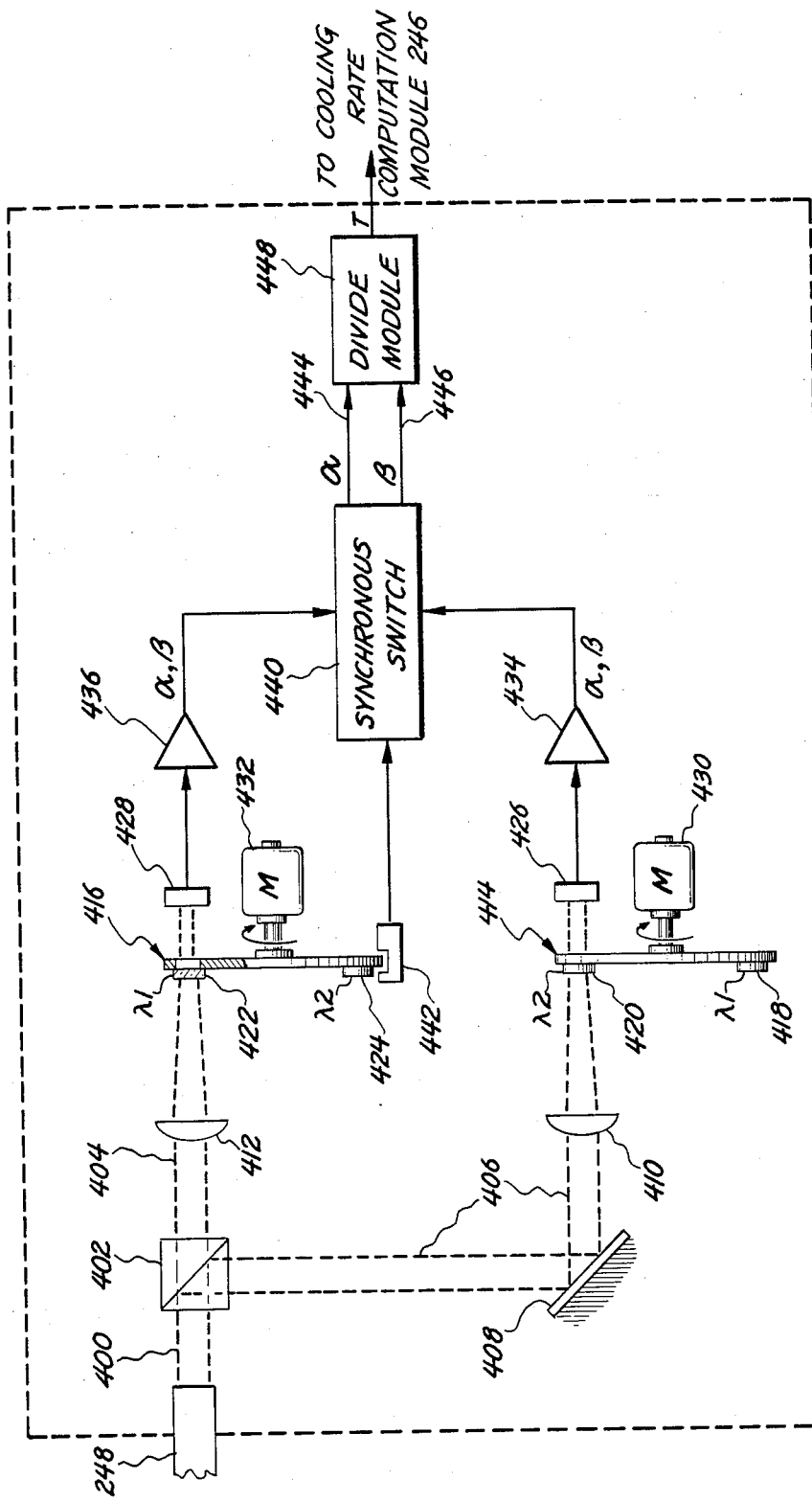
FIG. 5 illustrates in greater detail the temperature determination module illustrated in FIG. 3.

FIG. 5 illustrates ratio pyrometer apparatus, constructed in accordance with the preferred embodiment of the present invention, in which the measurement interval time is zero. The apparatus illustrated in FIG. 5 may serve as temperature determination module 244 of processing system 200 (FIG. 3) and it is so designated. The image of the laser beam-material interaction point is introduced into module 244 via branch 248 of fiber optic bundle 240. An incident image 400 is directed into a prismatic beam splitter 402 so that it is split into image portions 404 and 406. It is noted that while the use of the beam splitter is preferred herein, the image could instead be split into two portions by dividing fiber optic branch 248 into two portions. Image portion 406 is reflected, by a mirror 408, through a focusing lens 410 while image portion 404 is directed through a focusing lens 412. The images focused through lenses 410 and 412 are respectively directed onto filter wheels 414 and 416. Each filter wheel 414, 416, constructed substantially the same as filter wheel 304 of ratio pyrometer 300 (FIG. 4), carries two wavelength filters which are brought into registration with the focused image. Thus, filter wheel 414 carries filters 418 and 420 for respectively transmitting only infrared radiation, contained in the focused image, having wavelengths $\lambda_1$ and $\lambda_2$. Similarly, filter wheel 416 has mounted thereon filters 422 and 424 for respectively only transmitting the $\lambda_1$ and $\lambda_2$ wavelengths of the image focused thereon. The focused image passing through each filter on filter wheel 414 is directed onto a detector 426 while a detector 428 is positioned to receive the image focused through either of the filters on filter wheel 416. As in the case of ratio pyrometer 300 (FIG. 4), detectors 426, 428 may each comprise a photodiode.

Filter wheels 414 and 416 are respectively driven by motors 430 and 432. The operation of motors 430, 432 is controlled to synchronize the rotation of the two filter wheels. The rotations of the filter wheels are synchronized so that at the instant a $\lambda_1$ filter on one wheel is in registration with the focused image, the $\lambda_2$ filter on the other wheel is in registration with the focused image. As a result, the infrared radiation intensities at the $\lambda_1$ and $\lambda_2$ wavelengths are detected at substantially the same instant of time. The measurement time interval, as defined above, between the $\lambda_1$ and $\lambda_2$ intensity measurements is therefore zero.

Thus, each detector 426,428 generates, at substantially the same instant, an analog signal proportional to the intensity of the radiation incident thereon. The analog signals generated by detectors 426 and 428 are respectively amplified by amplifiers 434 and 436. Consistent with the terminology used with respect to ratio pyrometer 300, the amplified analog signals due to wavelengths $\lambda_1$ and $\lambda_2$ are respectively designated $\alpha$ and $\beta$. The amplified signals are applied to a synchronous switch 440. Synchronous switch 440 is also coupled to receive the output of a synchronous detector module 442 mounted proximate to filter wheel 416. Module 442 may be constructed as described for module 316 of ratio pyrometer 300 (FIG. 4) and serves the same purpose of providing synchronizing signals as described for module 316. Synchronous switch 440 may be provided as a dual, single pole-single throw analog switch, model no. HI-5043 manufactured by Harris Semiconductor Company of Dallas, Texas. Using this device, each synchronizing signal from module 442 is used to appropriately reset the switch positions in the synchronous switch to respectively provide on outputs 444 and 446 the $\alpha$ and $\beta$ signals being provided at that instant by the two filter wheels. Synchronous switch outputs 444,446 are coupled to the appropriate inputs of a divide module 448 to apply thereto the $\alpha$ and $\beta$ signals. Divide module 448 may be provided as a model no. AD534 precision multiplier manufactured by Analog Devices Company of Norwood, Massachusetts, that multiplier being used in the divide mode for the instant application. The divide module provides output signal "T" representative of the quotient $\alpha/\beta$. As previously discussed, the quotient is proportional to the temperature of the image region which in the case of processing system 200 is the point of laser beam-material interaction. It is reiterated that signal "T" is only proportional to temperature and that calibration would be required to determine actual temperature values. Since these temperature proportional signals are used herein to compute cooling rate, which only reflects the relative change in temperature as a function of time, there is no need to perform a calibration to determine actual temperature values. For convenience only, however, temperature signals "T" are referred to herein as temperature values.

As previously noted, one reason for the use of a single detector in ratio pyrometer 300 (FIG. 4) was to avoid a detector drift problem. It is therefore possible that by the use of the two detectors 426,428 in the ratio pyrometer illustrated in FIG. 5, a detector drift problem may be experienced. However, the alternating use of each detector to measure the $\lambda_1$ and $\lambda_2$ wavelength intensities serves to minimize the effect of any drift problem. One method known in the art for limiting detector drift, that may be practiced herein, is to enclose such a detector in a miniature furnace which serves to maintain the detector at a constant temperature. For example, this method is used by manufacturers of laser radiometers and a particular device incorporating this method is the model no. 460 laser pyrometer manufactured by EG&G Company of Salem, Massachusetts. That power meter uses furnace heating to maintain a detector at a constant temperature of 40° C. and thereby minimizes detector drift.

As is well known in the art, pulsed lasers are typically constructed to provide a synchronizing signal consisting of a pulse train in which each synchronizing pulse is generated in advance of each laser beam pulse. It is preferred herein to use the laser synchronizing signal pulses to operate motors 430 and 432 in synchronism. As a result, following each synchronizing pulse, for a given motor speed, the position of each filter wheel is a predetermined function of time. Means and method for controlling the motors to operate in synchronous fashion, given the availability of a synchronizing signal, are well known in the art. Motors which can be controlled to operate in the manner described herein are manufactured by the Compumotor Division of Parker-Hannifin Corporation of Petaluma, Calif. as model C/CX 57-51. Motors 430,432 when provided as the model C/CX 57-51 motors, can be simultaneously driven by a model PC23 indexer board, also manufactured by the Compumotor Division. That indexer board is user programmable to drive the motors simultaneously, while maintaining there respective shafts in the desired relative positions, in accordance with an externally provided trigger signal. Thus, as described above, the laser synchronizing signal can be applied to the indexer board as the trigger signal to control motor operation as required.

It is noted that the rotational speed at which motors 430,432 are selected to operate, depends in part upon the laser pulse rate to be employed in the particular process application. Since, as described above, it is desired to determine cooling rate during the laser off state, it is necessary to operate the motors at a speed sufficient to obtain at least two temperature measurements during that off state. The above noted Raytheon model #SS550 laser can generated beam pulses at a rate adjustable between 0 and 200 pulses per second. Note also that the number of filters provided on each filter wheel is not limited to two, as illustrated in FIG. 5, and that multiple $\lambda_1$ and $\lambda_2$ filters may be distributed, alternately and with angular uniformity, around the filter wheel. Where multiple filters are provided, this will also be a factor in determining the required motor speed.

Figure 6:
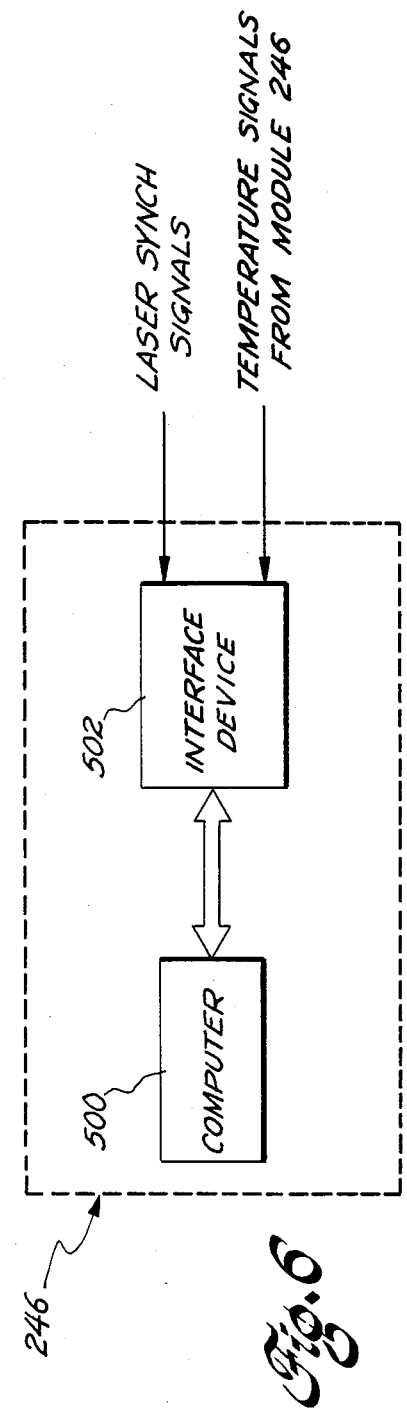
FIG. 6 illustrates in greater detail the cooling rate computation module illustrated in FIG. 3.

As can be seen in FIGS. 2 and 5, the temperature signals generated by module 244 are provided to cooling rate computation module 246. FIG. 6 illustrates module 246 in greater detail. Referring to FIG. 6, it is preferred herein that module 246 comprise a computer 500 such as an IBM PC/AT computer for computing the cooling rates. While the results of the cooling rate computation are provided to controller 236 (FIG. 3) which is illustrated as a separate element, computer 500 may actually be the same computer as is used for effecting the overall control, as part of controller 236, of process 200. Since, as described above, the temperature signals provided by module 244 are in analog form, it is necessary in interfacing the cooling rate computer to module 244 to effect an analog-to-digital (A/D) signal conversion. This can be accomplished by including in module 246 an interface device 502 that effects the A/D conversion, such as a METRABYTE DASH 16 TM interface board, manufactured by Metrabyte Corporation of Stoughton, Massachusetts. That interface board also has the capability of sampling the analog voltages applied thereto at a predetermined rate, for example 100,000 samples per second. It is further noted that the PC23 indexer board described above for control of motors 430,432 is fully compatible with the IBM PC/AT computer, preferred herein, for programming motor operation.

In the case of either a pulsed or a CW laser beam, it may be undesirable to use the temperature information obtained, by infrared radiographic techniques, at the laser beam-material interaction point while the laser beam is on. This is because reflections of the laser beam off of the workpiece and plasma emitted during the laser beam-material interaction represent superfluous radiative emissions that cause incorrect intensity measurements. It is therefore preferred herein to exclude such temperature information from the cooling rate determination. Methods for accomplishing this exclusion are described below. It is noted, however, that in some applications it may be desirable to determine a heating rate on the workpiece while the laser beam is on. Temperature measurements made as part of such a heating rate determination would have to be adjusted for the above noted sources of superfluous radiative emissions.

FIG. 7 illustrates a flowchart 550 representation of a program executed by the cooling rate computer in calculating the cooling rate from the temperature information provided thereto. Flowchart 550 is specifically adapted for use with a pulsed laser. It can however be adapted, with minimal modification, for use in a process employing a CW laser. In order to execute flowchart 550, it is necessary for computer 500 to determine whether the pulsed laser is in the on-state or the off-state. This is necessary so as to avoid using temperature information derived from measurements made while the laser is on. As seen in FIG. 6, the computer is also coupled to receive the above-described laser synchronizing signal. Since the timing of each laser synchronizing pulse relative to each laser beam pulse is predetermined, as is the duration of each beam pulse, a window corresponding to the off-state of the laser beam can be defined. The window would therefore define a period during which temperature information could be used for cooling rate determination.

Figure 8:
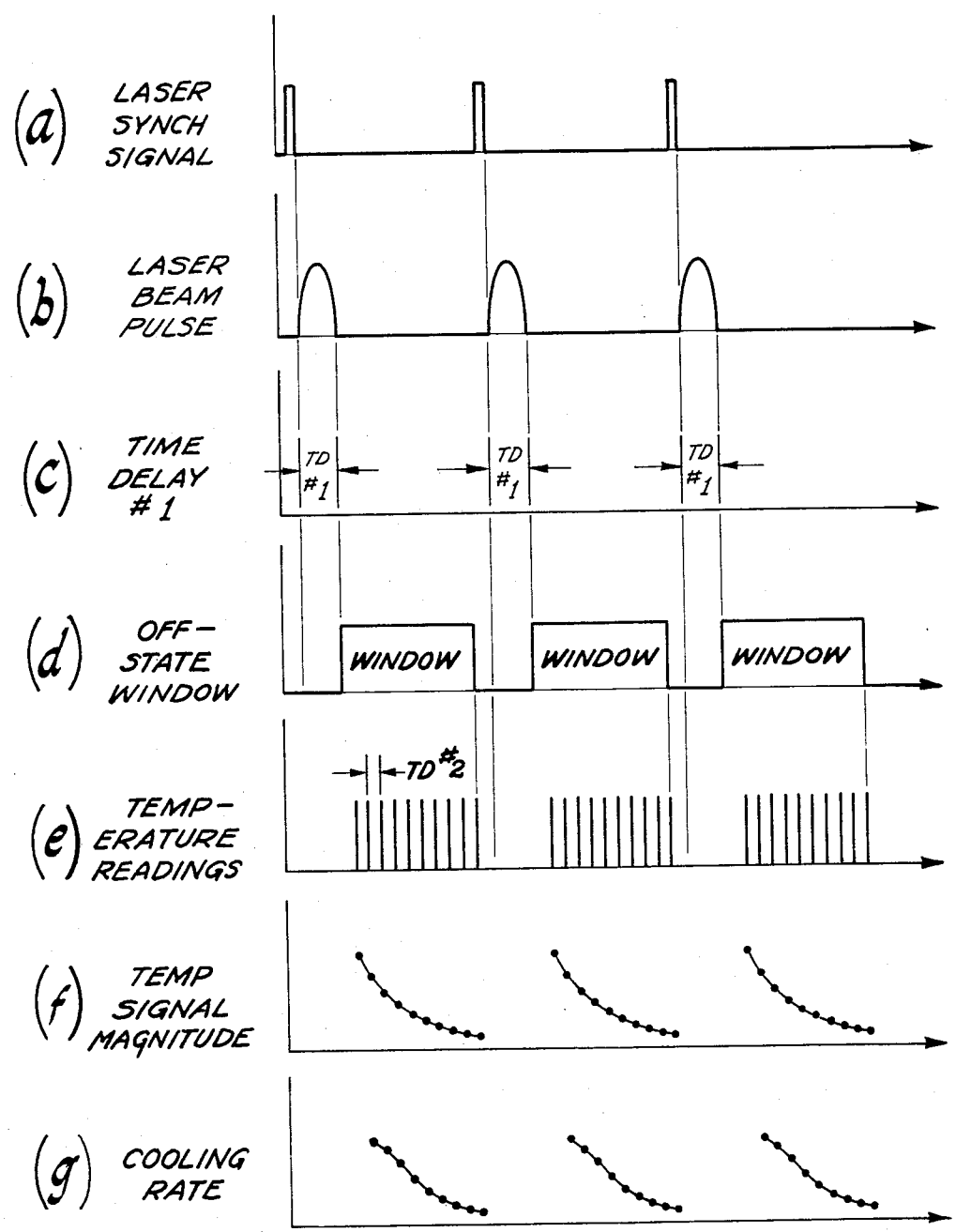
FIG. 8 illustrates a plurality of plots showing the behavior of various parameters of interest in the practice of the present invention.

FIG. 8 illustrates the waveforms of the laser synchronizing signal, laser beam and the off-state window, each as a function of time, respectively as plots (a), (b) and (d). As can be seen, the laser synchronizing signal consists of narrow pulses each of which immediately precede the generation of the laser beam pulse. The beam pulse is illustrated as having a duration equal to a time delay #1 (TD#1), that delay being illustrated in plot (c) of FIG. 8. For the above-noted Raytheon #SS550 laser, each synchronizing signal pulse typically has a duration of approximately 100 microseconds and the duration of each beam pulse can be set at between 0.6 to 7.0 milliseconds. It is preferred herein that each off-state window opens substantially immediately following the end of the laser beam pulse, the end of the beam pulse being determined by using the laser synchronizing signal pulse to initiate measurement of time delay #1. The window duration is arbitrarily chosen so that the window closes prior to arrival of the next laser beam pulse. With the required information available to it, computer 500 is programmed to determine when the laser off-state window is open. It is also preferred herein that prior to each operation of system 200 (FIG. 3), the laser be operated for a brief start-up period, e.g. up to one minute, with the laser mechanical shutter closed so that a regular period of laser beam pulse generation is established. Computer 500 receives the laser synchronizing signal during the start-up period and preferably would be programmed to count the number of synchronizing pulses received during this period and compute therefrom the actual laser pulse rate. This computed pulse rate would then be used for determining the off-state window occurrences.

Referring again to FIG. 7 and flowchart 550, the program commences with a step 552 in which an index "i", used for differentiating between successive temperature measurements, is set equal to "1". Next, at a step 554, the computer determines if the off-state window is open. The program proceeds no further until the window is open. Upon the window opening, the program proceeds to step 556 in which the computer reads the value of the temperature signal being provided to it, in digital form, from module 246 via interface device 502. The time of the reading is also noted. Due to the nature of the operation of the ratio pyrometer apparatus of module 246, it is clear that temperature signals are generated by that module at discrete points in time dependent on the filter wheel positions. As previously stated, motor operation is synchronized to the laser synchronizing signal pulses. As a result, the filter wheel positions and hence time of generation of temperature signals by module 246 is known as a function of time relative to each synchronizing pulse. Since computer 500 is coupled to receive the laser synchronizing signal and, further, since the time function of temperature signal generation is known, the computer is further programmed to read the temperature signals provided thereto at discrete points in time determined on the basis of the times when the successive temperature signals are expected to be provided thereto. The time between the provision of successive temperature signals to the computer is designated time delay #2. The discrete points in time when the computer reads the temperature signals are illustrated in plot (e) of FIG. 8 as a series of vertical lines. The time interval between each pair of lines is time delay #2 (TD #2).

Thus, upon reaching step 556 (FIG. 7) of the program after the window initially opens, the computer reads the temperature value at the appropriate point in time. The temperature value so read is identified as $T_i$ and the time of the reading is designated $t_i$. The program then proceeds to step 558 in which it determines if the window is still open and if it is, step 560 is executed in which the values of $T_i$ and $t_i$ are stored. If the window is no longer open, the program returns to step 552. Following step 560, the computer waits until the next discrete point in time when it is appropriate to read the temperature value provided thereto. This is indicated at step 562 in which the duration of the computer wait is indicated as time delay #2 which, as defined above, is the time between provision of successive temperature values to the computer. Thus, after waiting through the time delay #2 period, the computer, at step 564, reads the next temperature value and notes the time of the reading. These temperature and time readings are respectively designated $T_{i+1}$ and $t_{i+1}$. At step 566, it is again determined whether the off-state window is open and if it is, the values of $T_{i+1}$ and $t_{i+1}$ are stored (step 568). If the window is not open, the program returns to step 552. The window status is periodically checked (steps 558, 566) to assure that no temperature measurement made while the laser is on is used for the cooling rate computation.

At step 570, the stored values of temperature and time are used to compute the cooling rate in accordance with the equation shown in block 570 in FIG. 7. The computed cooling rate is stored, at step 572, and is therefore available for use in process control by controller 236 (FIG. 3). It is noted that since the time between temperature readings is the predetermined time delay #2, the step of storing the current time of each temperature reading may be eliminated. The difference between successive temperature values would then simply be divided by time delay #2 to compute the cooling rate. The notation of reading times is indicated in steps 556 and 564 to illustrate a more general case of cooling rate computation, such as would be required where the time between successive readings is not predetermined.

Still referring to flowchart 550 in FIG. 7, following step 572, the value of index "i" is incremented by "1" (step 574) and the program returns to step 562 where the computer waits a period equal to time delay #2 before reading the next temperature signal. Thus the program continuously loops through steps 562 through 574 computing a new cooling rate value on the basis of each successive temperature reading. Exemplary plots of successive temperature measurement values and corresponding computed cooling rates, as a function of time, are respectively illustrated in plots (f) and (g) of FIG. 8.

Referring again to FIG. 3, it is thus seen that the cooling rate values computed by modules 246 are available to closed-loop controller 236. As a result, arm 208 of robot 210 may be controlled in real time on the basis of the real time cooling rate being experienced in workpiece 202 at the point of laser beam-material interaction.

As stated above, modification to flowchart 550 of FIG. 7 is required for practice of the present invention with a CW laser. Use of a CW laser eliminates the availability of the laser synchronizing signal which, in the preferred embodiment described hereinabove, serves as a reference signal for synchronizing filter wheel motor operation and determining discrete points in time for the computer to read temperature values. It is therefore necessary to provide a reference signal for CW laser applications. Such a reference signal can be provided by way of timing signals generated by the computer. These timing signals can be used as the trigger signal to synchronize motor operation and to define the points in time for temperature readings by the computer.

It is further noted that there is no significance to defining off-state windows for a CW laser application. As stated above, it is preferred herein to exclude from the cooling rate determination, temperature measurements taken at a point of laser beam-material interaction while the laser beam is on. In the case of the CW laser, the fact that the beam is on can be simply determined by having the computer program compare each radiation intensity measured, either $\alpha$ or $\beta$, against a predetermined value corresponding to the laser beam being on. When the measured intensity exceeds the predetermined "beam on" value, the computer program does not store the corresponding temperature value.

As described hereinabove, the computation of cooling rate requires notation of the reading times of successive temperature readings. It is important to note that the time associated with each temperature reading is understood to represent a time at which the temperature occurred. However, the time at which the temperature signal is received can readily be used as the occurrence time. Consistent use of the temperature signal receipt time has no effect on the computed cooling rate since that rate depends on the time duration between successive temperature readings. It is further noted that processing time in module 244 between directing filtered images onto detectors 426,428 and generating temperature signal T is on the order of 100's of nanoseconds. As a result, there is no significant distinction, for cooling rate computation purposes, between defining occurrence time as the actual time of temperature occurrence or the time of temperature signal receipt.

While the temperature determination module described in detail hereinabove generates a temperature signal using analog components, the invention is not so limited. Digital components can instead be implemented to convert and process the respective signals provided by detectors 426,428 in digital form. Then, divide module 448 would be provided as a digital component to compute the required quotient and provide to cooling rate computation module 246 the magnitude of temperature signal T in digital form.

While the symbols $\alpha$ and $\beta$ are respectively associated with the $\lambda_1$ and $\lambda_2$ infrared radiation wavelengths described hereinabove, these designation are purely arbitrary. With respect to computing the quotient in divide module 448, the initial selection of the two wavelength intensities as divisor and dividend is purely arbitrary. It is only important that the same one of the two wavelength intensities always be the divisor so that the other is always the dividend. It is noted that, though not absolutely required, the conventional approach in the art is to compute the quotient with the intensity corresponding to the longer of the two wavelengths as the numerator.

While the temperature determination module described in detail hereinabove is used to provide temperature readings for the determination of cooling rate, the invention is not so limited. The module as readily provides temperature readings under any other process circumstances, such as workpiece heating while the laser beam is on. Temperature readings generated under such other process circumstances may have utility in the control of the process or to merely provide performance data. As noted above, the temperature readings derived from an image of the laser beam-material interaction point while the laser beam is on require adjustment for the presence of superfluous radiative emissions.

While temperature determination with a ratio pyrometer is preferably practiced using radiation wavelengths in the infrared range, the use of infrared wavelengths is not an absolute requirement. The object the temperature of which is being measured may emit radiation at wavelengths shorter than the infrared range. In such a case, one or a pair of the shorter wavelengths may be selected for use in the ratio pyrometer so that the quotient of the respective intensities at the selected wavelengths is used to generate the temperature proportional signal. Materials being subjected to laser materials processing may emit such shorter wavelengths upon being heated by the laser beam.

The laser materials processing system of the preferred embodiment uses optical fibers to deliver the power laser beam and transmit the image used for temperature determination. The invention is, however, not so limited. As is well known in the art, materials processing is as readily practiced without delivery of the power laser beam via an optical fiber. Also, an image of the workpiece region the temperature of which is to be measured may be transmitted to infrared radiometric apparatus by conventional optical means, e.g. lenses, mirrors, etc., rather than by imaging optical fibers.

While a ratio pyrometer has been specifically adapted for use in temperature module 244 for practice of the preferred embodiment of the present invention, the invention is not so limited. The present invention may be successfully practiced with other infrared radiometric devices adapted to generate temperature signals in real time from the received image of the workpiece predetermined region.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Temperature determination apparatus for use in a laser materials processing system, said processing system including means for subjecting a workpiece to a laser beam generated by a materials processing laser, said temperature determination apparatus providing temperature signals each representative of the temperature currently being experienced in a predetermined region of said workpiece, said temperature determination apparatus comprising:
   means for receiving an image of said predetermined region of said workpiece;
   radiometric means for generating from the received image of said predetermined region said temperature signal;
   said radiometric means including:
      means for generating a first and a second intensity signal respectively representative of radiation intensities at a first and a second predetermined infrared radiation wavelength detected substantially simultaneously in said image; and
      means for computing a magnitude of said temperature signal in proportion to a quotient of the respective magnitudes of said first and second intensity signals; said intensity signal generating means including:
      a first and a second rotatable infrared wavelength filter wheel each for filtering said image to permit transmission of said first or said second predetermined wavelength; and
      means for synchronizing rotation of said first and second wheels so that said first and second wheels together provide substantially simultaneous transmission of said first and second predetermined wavelengths; and said radiometric means generating said temperature signals respectively corresponding to the current temperature in said workpiece predetermined region at successive points in time, so that said temperature signals are available to compute a cooling rate being experienced in said workpiece predetermined region.

2. The temperature determination apparatus of claim 1 further comprising:
   means for splitting said workpiece area image into a first and a second workpiece area image portion;
   said intensity signal generating means including:
      a first and a second wavelength filter mounted on said first filter wheel;
      a third and a fourth wavelength filter mounted on said second filter wheel;
      said first and third filters each permitting transmission therethrough of said first predetermined infrared wavelength;
      said second and fourth wavelength filters each permitting transmission therethrough of said second predetermined infrared wavelength;
      said first filter wheel aligned so rotation thereof alternately brings said first and second filters into registration with said first image portion;
      said second filter wheel aligned so rotation thereof alternately brings said third and fourth filters into registration with said second image portion;
      first detector means for generating a first or second analog signal in response to said first image portion as transmitted by said first or second filter, respectively;
      second detector means for generating the first or second analog signal in response to said second image portion as transmitted by said third or fourth filter, respectively;
      amplifier means for amplifying said first and second analog signals and providing the amplified signals to said temperature signal magnitude computing means as said first and second intensity signals, respectively;
   said synchronizing means synchronizing rotation of said first and second wheels so that said first and fourth wavelength filters are simultaneously brought into registration with said first and second image portions, respectively, and said second and third wavelength filters are simultaneously brought into registration with said first and second image portions, respectively;
   so that said first and second intensity signals are generated from filtered images simultaneously provided by said first and fourth wavelength filters or by said second and third wavelength filters.

3. Apparatus, for use in a materials processing system, for determining a current temperature in a predetermined region of a workpiece being subjected to a laser beam generated by a materials processing laser, said processing system including control means for controlling the operation of said laser and means for receiving the determined current temperatures to compute therefrom a cooling rate experienced in said predetermined region, said control means controlling the operation of said laser in response to the computed cooling rate, said temperature determination apparatus comprising:
   means for receiving an image of said workpiece predetermined region;
   means for generating a first and a second intensity signal respectively representative of infrared radiation intensities occurring substantially simultaneously in said image at a first and a second predetermined wavelength;
   said intensity signal generating means including:
      a first and a second rotatable infrared wavelength filter wheel each for filtering said image to permit transmission of said first or said second predetermined wavelength; and
      means for synchronizing rotation of said first and second wheels so that said first and second wheels together provide simultaneous transmission of said first and second predetermined wavelengths;
   means for generating a third signal representative of a quotient of said first and second intensity signals, said third signal being representative of the temperature of said workpiece predetermined region; and
   means for providing said third signal to said cooling rate computing means so that successively generated values of said third signal are available to compute the cooling rate of said workpiece predetermined region.

4. The apparatus of claim 3 wherein said materials processing laser generates a pulsed laser beam so that said laser beam alternates between an on- and off-state, said predetermined region of said workpiece including an area of laser beam-material interaction; and said cooling rate computing means computing said cooling rate only from values of said third signal representative of temperatures occurring while said laser beam is in said off-state.

5. A laser materials processing system, comprising:
means for subjecting a workpiece to a laser generated by a materials processing laser;
means for providing an image of a predetermined region of said workpiece;
means for generating from said image a temperature signal representative of a current temperature of said workpiece predetermined region;
cooling rate determining means for receiving at least two successive values of said temperature signal and noting occurrence times respectively associated therewith, said cooling rate determining means determining said cooling rate and providing a cooling rate signal representative of the cooling rate so determined; and
controller means for receiving said cooling rate signal and controlling the operation of said materials processing laser in accordance therewith.

6. The processing system of claim 5 wherein said materials processing laser generates a pulsed laser beam so that said laser beam alternates between an on- and an off-state, said predetermined region of said workpiece including an area of laser beam-material interaction; and said cooling rate determining means determining said cooling rate only from values of said temperature signal generated while said laser beam is in said off-state.

7. The processing system of claim 5, said temperature signal generating means comprising:
means for generating a first and a second intensity signal respectively representative of radiation intensities at a first and a second predetermined infrared radiation wavelength detected substantially simultaneously in said image; and
means for computing a magnitude of said temperature signal in proportion to a quotient of the respective magnitudes of said first and second intensity signals.

8. The processing system of claim 7, said intensity signal generating means comprising:
a first and a second rotatable infrared wavelength filter wheel each for filtering said image to permit transmission of said first or said second predetermined wavelength; and
means for synchronizing rotation of said first and second wheels so that said first and second wheels together provide simultaneous transmission of said first and second predetermined wavelengths.

9. A method for determining a cooling rate experienced in a predetermined region of a workpiece being subjected to a laser generated by a materials processing laser beam in a materials processing system, said processing system including control means for controlling the operation of said materials processing laser, said method comprising the steps of:

(a) receiving an image of said workpiece predetermined region;

(b) generating a first intensity signal and a second intensity signal respectively representative of infrared radiation intensities occurring substantially simultaneously in said image at a first and a second predetermined wavelength;

(c) generating a third signal representative of a quotient of said first and second intensity signals, said third signal being representative of a temperature of said workpiece predetermined region;

(d) noting a temperature occurrence time associated with said third signal;

(e) repeating steps (b) through (d) for a predetermined period; and (f) computing the cooling rate experienced in said predetermined region from successive values of said third signal and the occurrence times respectively associated therewith.

10. The method of claim 9 including the additional step, following step (f), of controlling the operation of said materials processing laser in response to the computed cooling rate.

11. The method of claim 9 wherein said materials processing laser generates a pulsed laser beam so that said laser beam alternates between an on- and an off-state, said predetermined region of said workpiece including an area of laser beam-material interaction, said predetermined period in step (e) being selected to occur during said laser beam off-state.

12. The method of claim 9 in which step (b) comprises the substeps of:
filtering said image to transmit only said first predetermined wavelength;
filtering said image to transmit only said second predetermined wavelength;
generating a first analog signal in response to the intensity of said first predetermined wavelength of said image;
generating a second analog signal in response to the intensity of said second predetermined wavelength of said image; and
amplifying said first and second analog signals to respectively generate said first and second intensity signals.

* * * * *